United States Patent [19]

Derkacy

[11] Patent Number: 5,032,550
[45] Date of Patent: Jul. 16, 1991

[54] HIGH IMPACT RESISTANT CERAMIC COMPOSITE

[75] Inventor: James A. Derkacy, Pittsburgh, Pa.

[73] Assignee: Aluminum Company of America, Pittsburgh, Pa.

[21] Appl. No.: 420,922

[22] Filed: Oct. 13, 1989

[51] Int. Cl.$^5$ .............................................. C04B 35/58
[52] U.S. Cl. ...................................... 501/92; 501/96; 501/88
[58] Field of Search .............................. 501/92, 96, 88

[56] References Cited

U.S. PATENT DOCUMENTS

| | | | |
|---|---|---|---|
| 3,775,137 | 11/1973 | Clougherty et al. | 501/92 |
| 4,327,186 | 4/1982 | Murata et al. | 501/92 |
| 4,762,810 | 8/1988 | Endo et al. | 501/91 |
| 4,837,231 | 6/1989 | Endo et al. | 501/92 |

OTHER PUBLICATIONS

McMurtry et al., "Microstructure and Material Properties of SiC-TiB$_2$ Particulate Composites", the Ceramic Bulletin, Feb. '67, vol. 66, No. 2.
Seshadri et al., "Fabrication and Mechanical Reliability of SiC-TiB$_2$Composites", Third International Symposium, Ceramic Materials and Components for Engines, American Ceramic Society, Las Vegas, Nov. 1988.

*Primary Examiner*—Mark L. Bell
*Assistant Examiner*—Sue Hollenbeck
*Attorney, Agent, or Firm*—David W. Pearce-Smith

[57] ABSTRACT

A ceramic material and a method of forming a ceramic material which possesses a high impact resistance. The material comprises: (a) a first continuous phase of $\beta$-SiC; and (b) a second phase of about 25-40 vol % TiB$_2$. Al$_2$O$_3$ is preferably used as a densification aid. The material is formed by hot-pressing the mixture at a temperature from greater than about 1800° C. to less than the transition temperature of $\beta$-SiC to $\alpha$-SiC. The hot-pressing is performed at a pressure of about 2000 psi to about 4000 psi in an inert atmosphere for several hours and results in the formation of a two phase sintered ceramic composite material.

14 Claims, 5 Drawing Sheets

1000X

1000X

400X

| Material | Vendor | Process | Thick (in.) | Density g/cm³ | % Por. | Avg. grain size microns | 4 pt strength psi | Elastic mod psi | Sonic Vel., c m/sec. | Elastic impedance ro-c | KIC MPa - M 1/2 | Micro hardness kg/mm² |
|---|---|---|---|---|---|---|---|---|---|---|---|---|
| AlN | Cercom | Hot press | 1.00 | 3.27 | 0.38 | 3.34 | 54899.00 | 46.5x10⁶ | 9906.00 | 3.24 | 3.48 | 1091.00 |
| Al₂O₃ | Cercom | Hot press | 0.08 | 3.98 | 0.04 | 1.16 | 63972.00 | 56.7.x10⁶ | 9880.00 | 3.93 | 3.21 | 2024.00 |
| SiC | Eagle Picher | Hot press | 1.00 | 3.16 | 0.23 | 1.56 | 38044.00 | 61.6x10⁶ | 11595.00 | 3.66 | 2.44 | 2549.70 |
| SiC (alpha) | Carborundum | Sintered | 1.00 | 3.14 | 0.00 | 3.15 | 52667.00 | 60.6x10⁶ | 11501.00 | 3.61 | 2.46 | 2642.25 |
| TiB₂ FG | Alcoa | Sintered | 0.70 | 4.50 | 0.00 | 3.15 | 43739.00 | 83.3x10⁶ | 11298.00 | 5.08 | 4.80 | 2081.31 |
| TiT₂ | Eagle Picher | Hot press | 0.70 | 4.50 | 0.00 | 2.01 | 34518.00 | 82.5x10⁶ | 12407.00 | 5.58 | 5.72 | 2340.85 |
| TSA-3 | Alcoa | Hot press | 0.70 | 3.57 | 0.05 | N.A. | 63774.00 | 72.7x10⁶ | 11847.00 | 4.23 | 6.57 | 2740.08 |
| Hexaloy | Carborundum | Sintered | 1.00 | 3.33 | ? | N.A. | 50576.00 | 63.4x10⁶ | 11452.00 | 3.89 | 7.73 | 3151.75 |
| A-B | Cercom | Hot press | 1.00 | 3.19 | 0.05 | N.A. | 61474.00 | 61.7x10⁶ | 11540.00 | 3.68 | 9.23 | 2893.17 |

FIG.4

HIGH IMPACT RESISTANT CERAMIC COMPOSITE

BACKGROUND OF THE INVENTION

The U.S. Government has rights to this invention pursuant to Contract No. DE-AC04-87AL4254 awarded by the Department of Energy (DOE).

1. Field of the Invention

This invention relates to high impact resistance ceramic materials. More particularly, this invention relates to a process for forming high density silicon carbide/titanium diboride composite materials by hot pressing blended powders with the addition of $Al_2O_3$ as a sintering aid.

2. Description of the Related Art

There is a need for a lightweight ceramic material having a high impact resistance. An increase in the impact resistance of ceramic armor materials will allow less ceramic material to be used to attain a desired impact resistance. Less ceramic material means that a vehicle containing that material is lighter and will have greater fuel efficiency. In aircraft, the lighter weight also means higher payloads. In addition, ceramic armor has been found to be effective in body armor, including vests for the protection of ground troops and police.

Lightweight ceramic materials formed from ceramics such as silicon carbide, titanium diboride, aluminum nitride, and aluminum oxide mixed with phases of other metal oxides have been found to be desirable from the standpoint of weight, strength, impact resistance, high temperature durability and chemical inertness. However, there still exists a need for a ceramic material which possesses a higher impact resistance.

Sintered ceramics made from compositions containing titanium diboride in a matrix of silicon carbide have been found to have very desirable properties. Silicon carbide does not occur naturally. It is produced by a high temperature chemical reaction of silica and coke. The reaction is most economically performed in a resistance furnace with the voltage passing through the resistance core generating temperatures of about 2400° C. Another method of producing SiC is by carbothermic reduction.

Research that has been conducted on these compositions have been performed primarily on material that contains alpha silicon carbide ($\alpha$-SiC). Alpha silicon carbide has either a hexagonal or rhombohedral unit cell. The cubic form of SiC is commonly referred to as beta silicon carbide ($\beta$-SiC). $\beta$-SiC has not been examined as extensively for armor applications because the SiC material that is used in forming the armor is processed at temperatures above 2000° C. If the SiC is formed or fired above the temperature at which $\beta$-SiC is transformed into $\alpha$-SiC (2000° C.), the SiC product will be $\alpha$-SiC.

McMurtry et al in an article entitled "Microstructure and Material Properties of SiC-TiB$_2$ Particulate Composites" in *The Ceramic Bulletin*, Feb., 1967, Vol. 66, No. 2, disclose the effect of a 16 vol % addition of TiB$_2$ to $\alpha$-SiC on mechanical, thermal, and electrical behavior. The material was pressureless sintered in an inert atmosphere at temperatures greater than 2000° C. The TiB$_2$ particles in a SiC matrix were shown to have caused crack tip deflection which resulted in a higher fracture toughness than compared with single phase sintered SiC, the pressureless sintered particulate composite, $\alpha$-SiC-TiB$_2$, exhibited up to a 90% increase in fracture toughness to 8.9 MPa and a 30% increase in flexural strength to 478 MPa at 20° C. with mechanical strength retention at temperatures less than 1200° C.

Seshadri et al in an article entitled "Fabrication and Mechanical Reliability of SiC-TiB$_2$ Composites" at the Third International Symposium, Ceramic Materials and Components for Engines, American Ceramic Society, Las Vegas, November 1988, disclose the enhanced mechanical and fracture properties of $\alpha$-SiC-TiB$_2$ ceramic composites over monolithic $\alpha$-SiC at temperatures in excess of 1000° C. The $\alpha$-SiC-TiB$_2$ composite is a two-phase particulate composite material containing discrete TiB$_2$ particles ranging from 1–5 microns. The TiB$_2$ phase is uniformly distributed throughout the matrix, with very little or no bonding present. The $\alpha$-SiC-TiB$_2$ composite was fabricated by pressureless sintering.

U.S. Pat. No. 4,327,186, issued to Murata et al, discloses a pressureless sintered silicon carbide-titanium diboride mixture and articles therefrom. The silicon carbide-titanium diboride material is useful in the fabrication of diesel engine precombustion chambers and honeycomb structures, such as those utilized in automobile emission control units. The patent teaches a material containing 5–20 wt % titanium diboride and 0.2 to about 3.0 wt. % of a densification aid. Boron-containing compounds, such as boron carbide, are preferred as a densification aid. The material has a 97.0% relative density. Murata et al teach that both $\alpha$-SiC and $\beta$-SiC are suitable SiC phases for use in the Murata et al invention. However, since the materials in the examples are sintered at 2150° C. for one hour, one would expect that if $\beta$-SiC is used in the initial mixture, it would be transformed into $\alpha$-SiC and there would not be any significant amounts of $\beta$-SiC present in the sintered product.

It would be advantageous, therefore, to provide a process whereby readily available and relatively inexpensive initial reactant materials can be formed into a sintered ceramic composite possessing a higher impact resistance than has been previously attained from ceramic materials.

The principal object of the present invention is to provide a high strength ceramic composite possessing an impact resistance that is higher than its individual components and higher than prior art compositions.

Another object of the present invention is to provide a process for producing a two phase ceramic material possessing superior impact resistance to projectile penetration.

These and other objects and advantages will be more fully understood and appreciated with reference to the following description.

SUMMARY OF THE INVENTION

The present invention relates to ceramic material and a method of forming a ceramic material which possesses a high impact resistance. The material of the present invention comprises: (a) a first continuous phase of about 60–75 vol % B-SiC; and (b) a second phase of about 25–40 vol % TiB$_2$. The first and second phases are at least semi-interlocking. Al$_2$O$_3$ is preferably used as a densification aid.

In a preferred embodiment of the material of the present invention, the ceramic material is a hot pressed composite having a density of at least 99% of theoretical density, and preferably greater than about 99.9%. The hot pressed composite contains agglomerates of TiB$_2$ particles dispersed in a $\beta$-SiC matrix. The TiB$_2$ particles that are used in the composition preferably have an average grain size of about 5.0 microns and they form agglomerates of about 20.0 microns and larger during hot pressing. These $TiB_2$ agglomerates form a semi-continuous phase. Surprisingly, the hot pressed ceramic composite material has an impact resistance which is much higher than either of its major components and also higher than $SiC/TiB_2$ which is produced by pressureless sintering. The increase in the impact resistance of the hot pressed $\beta$-$SiC/TiB_2$ material is greater than one would expect from changing the sintering process step to hot pressing.

The preferred method of the present invention includes: (a) mixing $TiB_2$, $\beta$-SiC and $Al_2O_3$ in an organic medium; (b) drying the mixture; and (c) hot-pressing the mixture at a temperature from greater than about 1800° C. to less than the transition temperature of $\beta$-SiC to $\alpha$-SiC. The hot-pressing should be performed at a pressure of about 2000 psi to about 4000 psi in an inert atmosphere for several hours and results in the formation of a two phase ceramic composite material. The silicon carbide in the hot pressed material is present in its beta form.

BRIEF DESCRIPTION OF THE DRAWINGS

Other features of the present invention will be further described or rendered obvious in the following related description of the preferred embodiment which is to be considered together with the accompanying drawings, wherein:

FIG. 4 is a Table showing selected properties of the preferred material of the present invention and prior art materials.

DETAILED DESCRIPTION OF THE INVENTION

Figure 1:
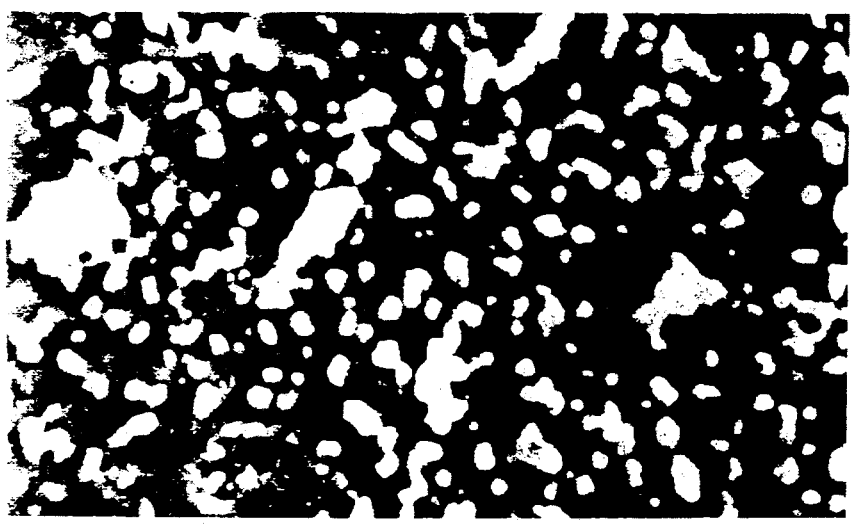
FIG. 1 is a photomicrograph showing the microstructure of the preferred ceramic material of the present invention.

To produce a hot-pressed ceramic material having an improved impact resistance by the process of the present invention, initial reactants $\beta$-SiC and $TiB_2$ are provided in volume ratio such that the $TiB_2$ is from 25–40 volume percent of the resulting $\beta$-SiC and $TiB_2$ mixture. 0.5–3.0 wt. % $Al_2O_3$ is blended into the mixture and it is hot pressed to form a $\beta$-SiC-$TiB_2$ composite material.

The silicon carbide component is a cubic or $\beta$-phase silicon carbide. The preferred particle size of the $\beta$-SiC powder is between about 0.3 microns and about 1.5 microns. The most preferred particle size of the $\beta$-SiC is in the submicron range and is between about 0.5 microns and 1.0 microns with an average particle size of 0.7 microns. The $\beta$-SiC material that is used in the present invention is formed by carbothermic reduction. This process produces a $\beta$-SiC material having particles in the submicron range and no comminution of the material is needed. A carbothermically produced $\beta$-SiC material having a particle size distribution which falls within the preferred particle size range is commercially available from H. C. Starck Inc. Alternatively, suitable silicon carbide material may be produced by grinding, ball milling or jet milling larger particles of silicon carbide and subsequently classifying or separating the desired component.

The titanium diboride starting component that has been found to be useful in the present invention has an average particle size between about 3.0 microns and about 8.0 microns. The most preferred average particle size for the titanium diboride component is about 5.0 microns. This titanium diboride material is commercially available from H. C. Starck Inc.

The $Al_2O_3$ component is a densification aid that is used to assist in hot-pressing the initial $\beta$-SiC and $TiB_2$ materials. Preferably, the $Al_2O_3$ is a high purity material and has an average particle size of less than 1.0 micron. As explained in greater detail below, it is mechanically mixed with the initial reactants $\beta$-SiC and $TiB_2$ prior to hot-pressing. The $Al_2O_3$ used in the examples was obtained from Baikowski Inc.

The components are thoroughly mixed prior to hot-pressing to obtain an intimate mixture. The means that are employed to mix the components are not considered to be critical to practicing the invention. However, since $TiB_2$ powders are highly reactive, nonaqueous blending and drying procedures are required for material processing. Excellent results have been obtained by ball mill, however other mixing methods familiar to one skilled in the art are also suitable.

The powders are wet milled under methanol using alumina media for 3 to 8 hours. After mixing, the slurry is transferred to drying trays and dried at a low temperature, such as 110° C., for example, to drive off alcohol. The material is then put through a 20 mesh screen and the resultant powder is free flowing.

The blend is then poured into a graphite die mold. After filling the molds, the temperature of the reactants is elevated by a suitable heating means to a temperature of at least 1800° C., preferably at least 1900° C. while applying a pressure of from about 2000 psi to about 4000 psi. The hot pressing is performed in an inert atmosphere such as helium or argon. It is believed that by maintaining the reactants at a given temperature of at least 1900° C. and at a pressure of at least 2000 psi for a sufficient period of time, initial reactants are compacted to a form a multi-phase $\beta$-$SiC/TiB_2$ composite material. During hot pressing, some of the $TiB_2$ particles agglomerate and form a semi-continuous phase in the continuous $\beta$-SiC matrix.

The period of time required to accomplish this reaction will vary with the temperature and pressure employed as well as the molar ratios of the components. Within a temperature range of from about 1900° C. to 2000° C., a heating time of 1–3 hours has been found to be sufficient to yield a two phase $\beta$-$SiC/TiB_2$ material in excess of 99% theoretical density. The upper limit on the temperature range that is used to hot press the material is the temperature at which $\beta$-SiC is transformed into $\alpha$-SiC. This transition temperature is approximately 2025° C.

The following examples are offered to illustrate the process of the present invention.

EXAMPLE 1

SiC-$TiB_2$ ceramic particulate composite material possessing a high fracture toughness is prepared from a mixture of $\beta$-SiC and $TiB_2$ in a 70:30 volume percent ratio. A 1.5 wt. % addition of alumina is blended into the mixture as a densification aid. This mixture is then charged into a 5.0 gal Nalgene ball mill where it is uniformly mixed for 4 hours using one gallon of methanol.

After ball milling, the slurry is dried at 100° C. to drive off methanol. The material is then put through a 20 mesh screen and the resultant powder is free flowing.

The blend is then place into a tooling mold to form plates. After filling the molds, temperature of the reactants is elevated to a temperature of approximately 1950° C. while applying a pressure of about 2500 psi for 2 hours. The blend is compacted into a material which is essentially a two phase $\beta$-SiC/TiB$_2$ composite having a density in excess of 99% of theoretical density.

FIG. 1 is a photomicrograph (1000× magnification) of a polished and etched specimen of the hot pressed material of Example 1. The $\beta$-SiC/TiB$_2$ composite is a dense continuous $\beta$-SiC matrix reinforced with a semi-continuous titanium diboride phase. The light gray areas in FIG. 1 are TiB$_2$ and the dark gray is the continuous $\beta$-SiC phase. From the photomicrograph of FIG. 1, it can be seen that the TiB$_2$ material has formed into agglomerates. The TiB$_2$ agglomerates have a length in excess of 20 microns.

The some of the physical properties of the hot pressed material are measured and determined to be as follows:

| | |
|---|---|
| Density (theoretical) | 3.59 g/cm$^3$ (99.9%) |
| Average Porosity | less than 1.0% |
| 4 Point Bend | 60.5 × 10$^3$ psi |
| Elastic Modulus | 75.3 × 10$^6$ psi |
| Sonic Velocity | 11750 M per sec. |
| Hardness | 2768 Kg per mm$^2$ |
| Fracture Toughness | 521 MPam$^{0.5}$ |

The hot pressed material is then fabricated into armor test targets by placing them into 6061-T6 aluminum alloy picture frames. The impact resistance of the material is then ballistically tested using a medium caliber armor piercing projectile.

Figure 2A:
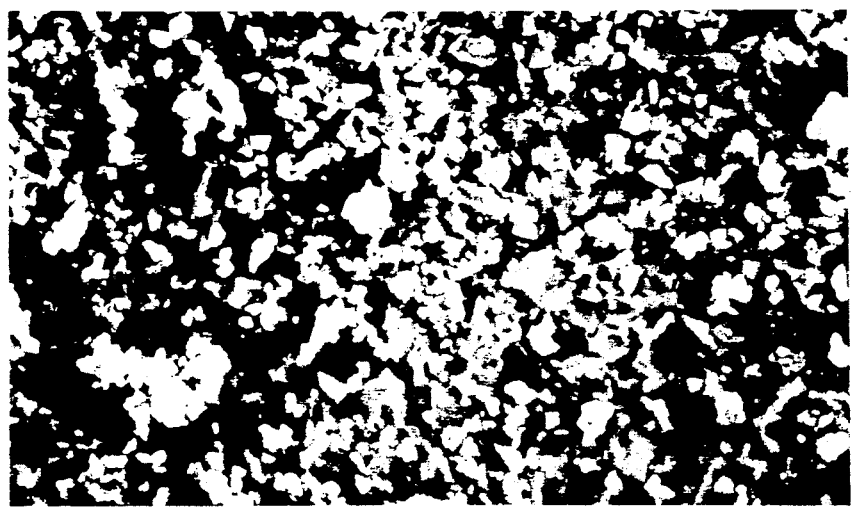
FIG. 2 are photomicrographs showing the microstructure of the ballistic fracture surface of the preferred ceramic material of the present invention at different magnifications.
Figure 2B:
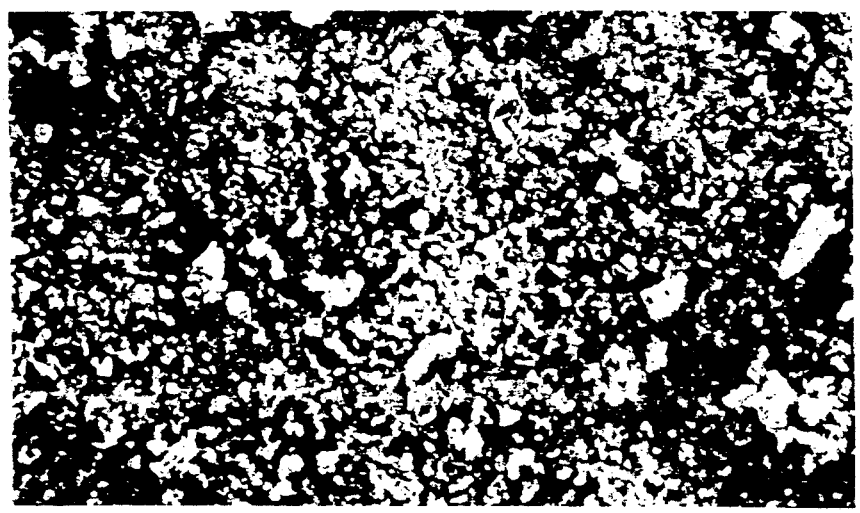

FIG. 2 contains photomicrographs showing the microstructure of the ballistic fracture surface of the $\beta$-SiC/TiB$_2$ material of Example 1 at 400× and 1000× magnification. It appears that the addition of TiB$_2$ agglomerates in the $\beta$-SiC matrix increased the crack path through the material during impact. The photomicrograph indicates that the crack propagated via a transgranular mode in the $\beta$-SiC matrix and via an interganular mode around the TiB$_2$ agglomerates. The agglomeration of the TiB$_2$ particles during hot pressing has thus increased the length of the crack.

Figure 3:
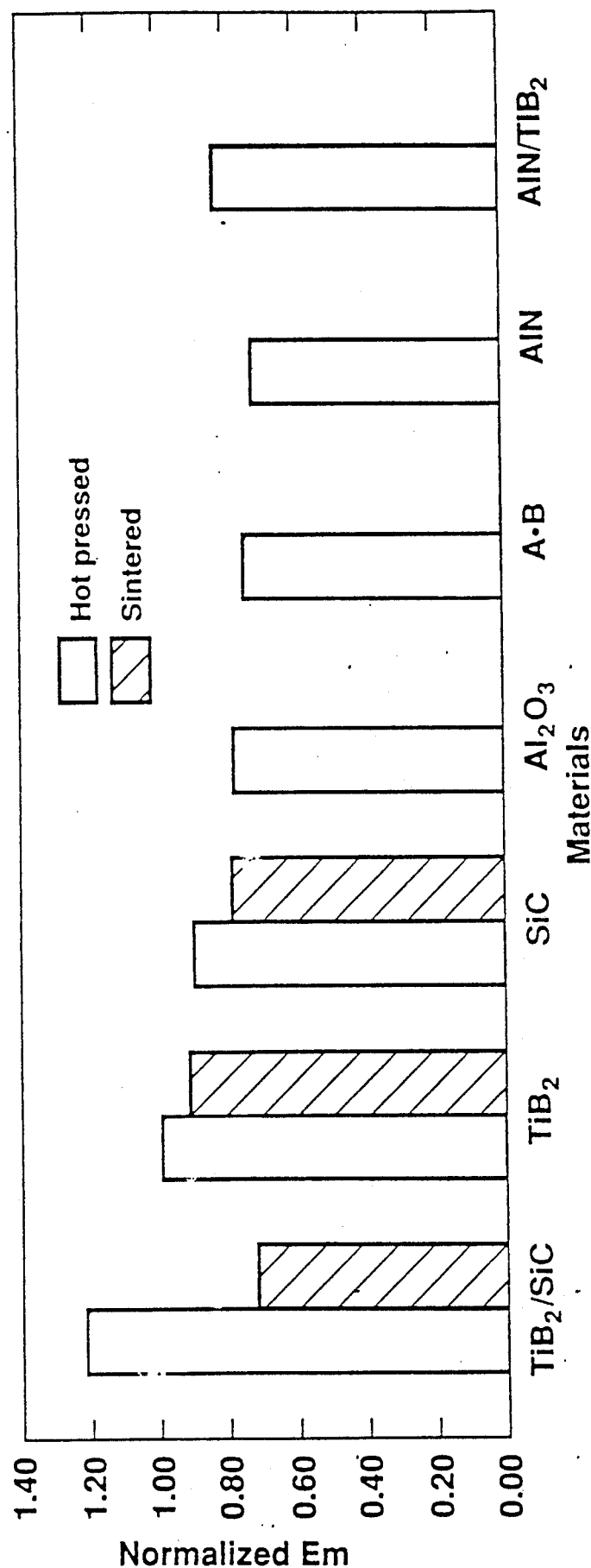
FIG. 3 is a bar graph comparing the ballistic performance of the material of the present invention with other high performance impact materials.

FIG. 3 is a bar graph comparing the results of ballistic performance of the $\beta$-SiC/TiB$_2$ material of Example 1 with other high impact performance ceramic materials. The results of impact testing is recorded as mass efficiency (Em) which has been normalized to hot pressed TiB$_2$. High mass efficiency is a desirable criteria for armor applications. The ballistic performance of the $\beta$-SiC/TiB$_2$ material of Example 1 was found to be significantly better than any other materials tested. The performance of the hot pressed $\beta$-SiC-TiB$_2$ material was approximately a 20% improvement over the next best material tested, a hot pressed TiB$_2$. It is believed that the crack deflection caused by the TiB$_2$ agglomerates in the matrix are responsible, at least in part, for the superior impact resistance of the $\beta$-SiC/TiB$_2$ material.

EXAMPLE 2

The ballistic testing is performed on a sample of pressureless sintered SiC/TiB$_2$ that was obtained from Carborundum Corp. This material is commercially available and sold under the trademark Hexaloy-ST. The impact resistance of the pressureless sintered SiC/TiB$_2$ material is then ballistically tested using a medium caliber armor piercing projectile according to the procedure of Example 1. The comparative ballistic results are shown in FIG. 3. The performance of the hot pressed $\beta$-SiC/TiB$_2$ material is approximately 50% higher than the performance of the SiC-TiB$_2$ of Example 2.

FIG. 4 is a photomicrograph (1000× magnification) of a polished and etched specimen of the pressureless sintered SiC/TiB$_2$ composite material of Example 2. The light gray areas in FIG. 4 are TiB$_2$ and the dark gray is the continuous $\alpha$-SiC phase. From the photomicrograph of FIG. 4, it can be seen that the TiB$_2$ material has not formed into agglomerates as large as those in the hot pressed $\beta$-SiC/TiB$_2$ material. The TiB$_2$ agglomerates have a length of less than 10 microns.

EXAMPLE 3

Figure 5:
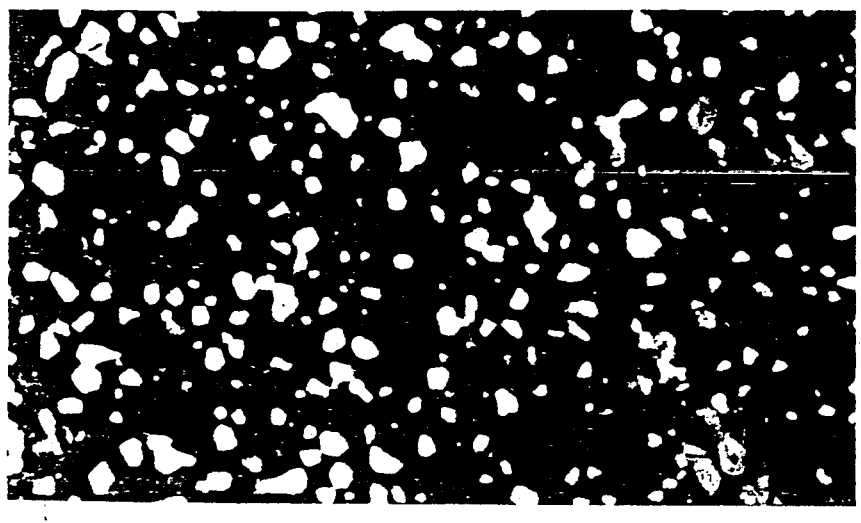
FIG. 5 is a photomicrograph showing the microstructure of a sintered prior art material, Hexaloy-ST.

The ballistic testing procedure of Example 1 was repeated with 38 other materials including TiB$_2$, SiC, Al$_2$O$_3$, A.B (Al$_2$O$_3$/B$_4$C multiphase composite material), AlN, and an AlN/TiB$_2$ laminate. The 10 best ballistic materials were included in the bar graph of FIG. 3. Selected properties of these materials can also be seen in the Table of FIG. 5. The Table of FIG. 5 indicates the vendor from which each material was obtained.

The comparative ballistic results are shown in FIG. 3. The performance of the hot pressed materials all fall within plus or minus 20% of the mass efficiency of hot pressed TiB$_2$. The $\beta$-SiC/TiB$_2$ material of Example 1 is the only material that performed better than hot pressed TiB$_2$. The $\beta$-SiC/TiB$_2$ material performed approximately 20% better than the hot pressed TiB$_2$ and 25% better than hot pressed SiC.

While the inventor does not wish to be bound by any theory of why the hot pressed ceramic materials possess an improved impact resistance, it appears that the superior results obtained in the $\beta$-SiC/TiB$_2$ material of Example 1 is the result of the use of the beta form of SiC, the addition of a material having an elastic moduli higher than the $\beta$-SiC, the presence of a continuous phase of TiB$_2$ within the $\beta$-SiC matrix, and the use of Al$_2$O$_3$ as a sintering aid.

It is contemplated that the $\beta$-SiC-TiB$_2$ composite of the present invention will also be useful as wear inserts and roller followers for engine components. Other applications include nozzles, seals, exhaust components and bearing guides that require high wear resistance and/or erosion resistance and armor applications with enhanced ballistic impact resistance.

Although the present invention has been described in terms of a TiB$_2$ powder, it is also contemplated that TiB$_2$ single crystal whiskers or platelets may also be used as a reactant material in practicing the invention. It is contemplated that whisker agglomeration and orientation during hot pressing may cause an increased impact resistance.

In addition, although the invention has been described in terms of a hot pressed two phase $\beta$-SiC-TiB$_2$ material, it is believed that this material is only one species in a genus of hot pressed multiphase materials in which the minor component is present in sufficient quantities so that chainlike agglomerates are formed and the minor component has an elastic modulus greater than the matrix component.

Furthermore, although the invention has been described in terms of a material that has been hot pressed using an $Al_2O_3$ densification aid, it is believed that other densification aids may also be used in practicing the invention. Other suitable densification aids include free silicon and free carbon. However, doping $\beta$-SiC with boron has been known to accelerate the $\beta$ to $\alpha$ transition. Therefore, it is believed that boron containing material should not be used as a densification aid.

While the invention has been described in terms of preferred embodiments, it is intended that all matter contained in the above description or shown in the accompanying drawings shall be interpreted as illustrative. The present invention is indicated by the broad general meaning of the terms in which the appended claims are expressed.

What is claimed is:

1. A method of forming a ceramic material having a high impact resistance, said method comprising the steps of:
   (a) forming a mixture of 60–75 vol. % $\beta$-SiC, 25–40 vol. % $TiB_2$ and 0.5–3.0 wt. % of $Al_2O_3$ as a densification aid; and
   (b) hot pressing said mixture at a temperature less than the transition temperature of $\beta$-SiC to $\alpha$-SiC to form a mixed phase $\beta$-SiC/$TiB_2$ material.

2. The method according to claim 1 wherein said step of forming a mixture $\beta$-SiC and $TiB_2$ includes:
   mixing $\beta$-SiC powder having an average particle size between about 0.3 microns and about 1.5 microns.

3. The method according to claim 1 wherein said step of forming a mixture of $\beta$-SiC and $TiB_2$ includes:
   mixing $TiB_2$ powder having an average particle size between about 3.0 microns and about 8.0 microns.

4. The method according to claim 1 wherein said step of forming a mixture of $\beta$-SiC and $TiB_2$ includes:
   wet milling said mixture in a nonaqueous solution;
   drying said mixture in air; and
   screening said mixture to minus 20 mesh.

5. The method according to claim 1 wherein said step of hot pressing said mixture includes heating said unreacted mixture to a temperature from about 1880° C. to 2000° C.

6. The method according to claim 1 wherein said step of hot pressing said unreacted mixture includes maintaining pressure of from about 2000 to about 4000 psi on said mixture.

7. A hot pressed ceramic material having an improved impact resistance, the material comprising:
   (a) 60–75 vol. % of a continuous SiC matrix which is $\beta$-SiC;
   (b) 25–40 vol. % of a second $TiB_2$ phase; and
   (c) 0.5 to 3.0 wt. % $Al_2O_3$.

8. The material of claim 7 in which said $TiB_2$ phase contains agglomerates of at least 20 microns in length.

9. The material of claim 7 in which said $TiB_2$ phase is semi-continuous.

10. A ceramic composite armor material comprising:
    (a) a continuous matrix of 60–75 vol. % $\beta$-SiC;
    (b) 25–40 vol. % $TiB_2$ agglomerates; and
    (c) 0.5 to 3.0 wt. % $Al_2O_3$.

11. The material of claim 10 in which said $TiB_2$ agglomerates are at least 20 microns in length.

12. The material of claim 10 in which said $TiB_2$ agglomerates form a semi-continuous phase.

13. A method of forming a ceramic armor material, said method comprising the steps of:
    (a) forming a mixture of 60–75 vol. % $\beta$-SiC, 25–40 vol. % $TiB_2$ and 0.5 to 3.0 wt. % of $Al_2O_3$; and
    (b) hot pressing said mixture at a temperature less than the transition temperature of $\beta$-SiC to $\alpha$-SiC to form a mixed phase $\beta$-SiC/$TiB_2$ material.

14. The method according to claim 13 wherein said step of forming a mixture $\beta$-SiC and $TiB_2$ includes:
    mixing $\beta$-SiC powder having an average particle size between about 0.3 microns and about 1.5 microns and $TiB_2$ powder having an average particle size between about 3.0 microns and about 8.0 microns.

* * * * *